US010037698B2

(12) United States Patent
Damiani et al.

(10) Patent No.: US 10,037,698 B2
(45) Date of Patent: Jul. 31, 2018

(54) OPERATION OF A VEHICLE WHILE SUPPRESSING FLUCTUATING WARNINGS

(71) Applicant: Nissan North America, Inc., Franklin, TN (US)

(72) Inventors: Andrew Damiani, Eastpointe, MI (US); Roy Goudy, Farmington Hills, MI (US); Neal Probert, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 75 days.

(21) Appl. No.: 15/222,701

(22) Filed: Jul. 28, 2016

(65) Prior Publication Data
US 2018/0033304 A1    Feb. 1, 2018

(51) Int. Cl.
*B60W 30/09*    (2012.01)
*G08G 1/16*    (2006.01)
(Continued)

(52) U.S. Cl.
CPC .............. *G08G 1/163* (2013.01); *B60W 30/09* (2013.01); *B60W 30/0953* (2013.01);
(Continued)

(58) Field of Classification Search
CPC ............ B60W 30/09; B60W 30/0953; B60W 30/0956; G05D 1/0011; G05D 1/0214;
(Continued)

(56) References Cited

U.S. PATENT DOCUMENTS

| 4,667,334 A | | 5/1987 | Collec et al. | |
| 5,493,302 A | * | 2/1996 | Woll ................. | B60K 31/0008 342/109 |

(Continued)

FOREIGN PATENT DOCUMENTS

| JP | 2001-118199 A | 4/2001 |
| JP | 2003-051099 A | 2/2003 |

OTHER PUBLICATIONS

Kurt, Arda et al., "Hybrid-state driver/vehicle modeling, estimation and prediction", 13th International IEEE Annual Conference on Intelligent Transportation Systems, Sep. 2010, pp. 806-811, Paper TA3.4, Madeira Island, Portugal.
(Continued)

*Primary Examiner* — Stephen Holwerda
(74) *Attorney, Agent, or Firm* — Young Basile Hanlon & MacFarlane, P.C.

(57) ABSTRACT

Operating a host vehicle is described as including identifying remote vehicle information indicating a geospatial state and a kinematic state for a remote vehicle and identifying host vehicle information indicating a geospatial state and a kinematic state for the host vehicle. For a sequence of sampling points, a converging time to a converging location within a transportation network is determined based on the remote vehicle information and the host vehicle information. Operation of the host vehicle is modified to a modified operation responsive to the converging time, having been above a first threshold, falling below the first threshold, and the modified operation of the host vehicle is maintained until the converging time remains above a second threshold higher than the first threshold for a defined number of contiguous sampling points of the sequence. A method, vehicle, and apparatus are described.

20 Claims, 13 Drawing Sheets

(51) Int. Cl.
*B60W 30/095* (2012.01)
*G05D 1/00* (2006.01)
*G05D 1/02* (2006.01)
*G08G 1/0965* (2006.01)
*G08G 1/0968* (2006.01)
*G08G 1/0967* (2006.01)

(52) U.S. Cl.
CPC ....... *B60W 30/0956* (2013.01); *G05D 1/0011* (2013.01); *G05D 1/0214* (2013.01); *G05D 1/0278* (2013.01); *G05D 1/0289* (2013.01); *G08G 1/0965* (2013.01); *G08G 1/096791* (2013.01); *G08G 1/096872* (2013.01)

(58) Field of Classification Search
CPC .. G05D 1/0278; G05D 1/0289; G08G 1/0965; G08G 1/096791; G08G 1/096872
See application file for complete search history.

(56) References Cited

U.S. PATENT DOCUMENTS

| | | |
|---|---|---|
| 5,640,323 A | 6/1997 | Kleimenhagen et al. |
| 5,939,976 A | 8/1999 | Sasaki et al. |
| 5,940,010 A | 8/1999 | Sasaki et al. |
| 6,008,741 A | 12/1999 | Shinagawa et al. |
| 6,049,269 A | 4/2000 | Byrd et al. |
| 6,223,117 B1* | 4/2001 | Labuhn ............. B60K 31/0008 180/169 |
| 6,236,337 B1 | 5/2001 | Beier et al. |
| 6,289,332 B2 | 9/2001 | Menig et al. |
| 6,529,831 B1 | 3/2003 | Smith et al. |
| 6,567,035 B1 | 5/2003 | Elliott |
| 6,603,406 B2 | 8/2003 | Jambhekar et al. |
| 6,615,137 B2 | 9/2003 | Lutter et al. |
| 6,700,504 B1 | 3/2004 | Aslandogan et al. |
| 6,759,942 B2 | 7/2004 | Bedi et al. |
| 6,791,471 B2 | 9/2004 | Wehner et al. |
| 6,810,328 B2 | 10/2004 | Yokota et al. |
| 6,985,089 B2 | 1/2006 | Liu et al. |
| 7,188,026 B2 | 3/2007 | Tzamaloukas |
| 7,190,260 B2 | 3/2007 | Rast |
| 7,295,925 B2 | 11/2007 | Breed et al. |
| 7,418,346 B2 | 8/2008 | Breed et al. |
| 7,835,396 B2 | 11/2010 | Nagura |
| 7,991,551 B2 | 8/2011 | Samuel et al. |
| 7,994,902 B2 | 8/2011 | Avery et al. |
| 8,000,897 B2 | 8/2011 | Breed et al. |
| 8,169,338 B2 | 5/2012 | Mudalige |
| 8,175,796 B1 | 5/2012 | Blackburn et al. |
| 8,229,350 B2 | 7/2012 | Smith, Jr. et al. |
| 8,229,663 B2 | 7/2012 | Zeng et al. |
| 8,314,718 B2 | 11/2012 | Muthaiah et al. |
| 8,340,894 B2 | 12/2012 | Yester |
| 8,451,732 B2 | 5/2013 | Nagura |
| 8,466,807 B2 | 6/2013 | Mudalige |
| 8,499,155 B2 | 7/2013 | Kherani et al. |
| 8,520,695 B1 | 8/2013 | Rubin et al. |
| 8,548,729 B2 | 10/2013 | Mizuguchi |
| 8,577,550 B2 | 11/2013 | Lu et al. |
| 8,587,418 B2 | 11/2013 | Mochizuki et al. |
| 8,639,426 B2 | 1/2014 | Dedes et al. |
| 8,648,709 B2 | 2/2014 | Gauger et al. |
| 8,675,603 B2 | 3/2014 | Lee et al. |
| 8,717,192 B2 | 5/2014 | Durekovic et al. |
| 8,848,608 B1 | 9/2014 | Addepalli et al. |
| 8,948,044 B2 | 2/2015 | Bansal et al. |
| 9,173,156 B2 | 10/2015 | Bai et al. |
| 9,214,086 B1 | 12/2015 | Onishi |
| 9,227,595 B2 | 1/2016 | Yang et al. |
| 9,229,088 B2 | 1/2016 | Cheng et al. |
| 9,241,249 B2 | 1/2016 | Yang et al. |
| 9,251,630 B2 | 2/2016 | Denny et al. |
| 9,297,891 B2 | 3/2016 | Karl |
| 9,297,892 B2 | 3/2016 | Smith et al. |
| 9,392,486 B2 | 7/2016 | Bai et al. |
| 9,449,515 B2 | 9/2016 | Rubin et al. |
| 9,619,996 B1 | 4/2017 | Smith |
| 2001/0044697 A1 | 11/2001 | Kageyama |
| 2002/0134602 A1* | 9/2002 | Kobayashi ......... B60K 31/0008 180/169 |
| 2002/0143457 A1* | 10/2002 | Hellmann ............. B60K 31/04 701/93 |
| 2002/0198632 A1 | 12/2002 | Breed et al. |
| 2005/0134440 A1 | 6/2005 | Breed |
| 2006/0015231 A1 | 1/2006 | Yoshimura et al. |
| 2006/0052909 A1 | 3/2006 | Cherouny |
| 2007/0050130 A1 | 3/2007 | Grimm et al. |
| 2007/0109111 A1 | 5/2007 | Breed et al. |
| 2007/0262881 A1 | 11/2007 | Taylor |
| 2007/0276574 A1* | 11/2007 | Isaji ......................... B60T 7/22 701/70 |
| 2008/0037577 A1 | 2/2008 | Nagura |
| 2008/0272898 A1* | 11/2008 | Irion ..................... B60Q 9/008 340/436 |
| 2008/0275618 A1* | 11/2008 | Grimm .................. G08G 1/162 701/96 |
| 2009/0033540 A1 | 2/2009 | Breed et al. |
| 2009/0140887 A1 | 6/2009 | Breed et al. |
| 2009/0198412 A1 | 8/2009 | Shiraki |
| 2010/0019891 A1 | 1/2010 | Mudalige |
| 2010/0094509 A1 | 4/2010 | Luke et al. |
| 2010/0169009 A1 | 7/2010 | Breed et al. |
| 2010/0198513 A1 | 8/2010 | Zeng et al. |
| 2010/0248618 A1 | 9/2010 | Bai et al. |
| 2011/0080302 A1 | 4/2011 | Muthaiah et al. |
| 2011/0087433 A1 | 4/2011 | Yester |
| 2011/0128902 A1 | 6/2011 | Guo |
| 2011/0238259 A1 | 9/2011 | Bai et al. |
| 2012/0016581 A1 | 1/2012 | Mochizuki et al. |
| 2012/0025965 A1 | 2/2012 | Mochizuki et al. |
| 2012/0215381 A1 | 8/2012 | Wang et al. |
| 2012/0218093 A1 | 8/2012 | Yoshizawa et al. |
| 2012/0310480 A1* | 12/2012 | Schmidt ................ B60W 50/14 701/41 |
| 2013/0015984 A1 | 1/2013 | Yamashiro |
| 2013/0099911 A1 | 4/2013 | Mudalige et al. |
| 2013/0116915 A1 | 5/2013 | Ferreira et al. |
| 2013/0154853 A1 | 6/2013 | Chen |
| 2013/0179047 A1 | 7/2013 | Miller et al. |
| 2013/0278440 A1 | 10/2013 | Rubin et al. |
| 2013/0278441 A1 | 10/2013 | Rubin et al. |
| 2013/0278443 A1 | 10/2013 | Rubin et al. |
| 2013/0279491 A1 | 10/2013 | Rubin et al. |
| 2013/0282277 A1 | 10/2013 | Rubin et al. |
| 2013/0297195 A1 | 11/2013 | Das et al. |
| 2014/0032049 A1* | 1/2014 | Moshchuk ......... B62D 15/0265 701/42 |
| 2014/0136044 A1* | 5/2014 | Conrad .................. G08G 1/166 701/23 |
| 2014/0307628 A1 | 10/2014 | Stahlin et al. |
| 2014/0347486 A1 | 11/2014 | Okouneva |
| 2015/0078291 A1 | 3/2015 | Guner |
| 2015/0197248 A1 | 7/2015 | Breed et al. |
| 2015/0200957 A1 | 7/2015 | Zhang et al. |
| 2015/0348412 A1 | 12/2015 | Onishi |
| 2016/0225254 A1 | 8/2016 | Durekovic et al. |
| 2017/0372612 A1 | 12/2017 | Bai et al. |

OTHER PUBLICATIONS

Kurt, Arda, "Hybrid-state system modeling for control, estimation and prediction in vehicular autonomy", presented in Partial Fulfillment of the Requirements for the Degree Doctor of Philosophy in the Graduate School of The Ohio State University, Mar. 2012, 136 pages, UMI/Proquest Pub. No. 3497707.

\* cited by examiner

OPERATION OF A VEHICLE WHILE SUPPRESSING FLUCTUATING WARNINGS

TECHNICAL FIELD

This disclosure relates to the field of vehicle warning systems, and in particular to operating a vehicle based on a location of a remote vehicle while suppressing fluctuating warnings.

BACKGROUND

Computerization of certain aspects of vehicles has led to a shift from completely manual control of vehicles to vehicles in which drivers are provided with varying levels of assistance. Some systems are passive in nature. In a passive system, a condition is detected, and the driver is warned of the condition. Other systems are active in nature. In an active system, a condition is detected and the vehicle assumes control of a certain system or modifies the control inputs made by the driver.

Some driver assistance systems are intended to warn drivers as to potential collisions. Collision warning systems that are currently in wide use rely on detection and ranging systems that utilize technologies such as Sonar, Radar, and Lidar. The signals generated by the detection and ranging system are used as a basis for determining whether a collision is imminent.

Collision warning systems that are based on vehicle-to-vehicle (V2V) communications are under development. One example of V2V communication is a system in which vehicles exchange a basic safety message or "BSM." The BSM that is broadcast by a vehicle can contain a number of data elements that describe various aspects of the operation of the vehicle or provide information about the vehicle itself. As one example, the BSM can include location and trajectory information. As another example, the BSM can include information that describes the vehicle type and size for the vehicle. In any event, the BSM may be used in collision warning systems.

SUMMARY

Disclosed herein are vehicle warning and informative systems.

One aspect of the disclosure is a method for operating a host vehicle. The method includes identifying remote vehicle information indicating a geospatial state and a kinematic state for a remote vehicle, identifying host vehicle information indicating a geospatial state and a kinematic state for the host vehicle, and for a sequence of sampling points, determining a converging time to a converging location within a transportation network based on the remote vehicle information and the host vehicle information. The method also includes modifying operation of the host vehicle to a modified operation responsive the converging time, having been above a first threshold, falling below the first threshold, and maintaining the modified operation of the host vehicle until the converging time remains above a second threshold higher than the first threshold for a defined number of contiguous sampling points of the sequence.

Another aspect of the disclosure is a vehicle that includes a powertrain, a sensor, and an operation system to operate the vehicle. The operation system is configured to identify remote vehicle information indicating a geospatial state and a kinematic state for a remote vehicle, identify, using at least the sensor, host vehicle information indicating a geospatial state and a kinematic state for the host vehicle, for a sequence of sampling points, determine a converging time to a converging location within a transportation network based on the remote vehicle information and the host vehicle information, modify operation of the host vehicle to a modified operation responsive the converging time, having been above a first threshold, falling below the first threshold, and maintain the modified operation of the host vehicle until the converging time remains above a second threshold higher than the first threshold for a defined number of contiguous sampling points of the sequence or until the remote vehicle information indicates that the remote vehicle is no longer on a converging path with the host vehicle, whichever occurs first.

Another aspect of this disclosure is an apparatus for controlling a host vehicle. The apparatus includes a processor and memory storing instructions that cause the processor to perform a method comprising identifying remote vehicle information indicating a geospatial state and a kinematic state for a remote vehicle, identifying host vehicle information indicating a geospatial state and a kinematic state for the host vehicle, for a sequence of sampling points, determining a converging time to a converging location within a transportation network based on the remote vehicle information and the host vehicle information, modifying operation of the host vehicle to a modified operation responsive the converging time, having been above a first threshold, falling below the first threshold, and ending the modified operation of the host vehicle, as long as the host vehicle information indicates that the host vehicle is not off, only if at least one of the converging time remains above a second threshold higher than the first threshold for a defined number of contiguous sampling points of the sequence or the remote vehicle information indicates that the remote vehicle is no longer on a converging path with the host vehicle.

These and other aspects of the present disclosure are disclosed in the following detailed description of the embodiments, the appended claims, and the accompanying figures.

BRIEF DESCRIPTION OF THE DRAWINGS

The invention is best understood from the following detailed description when read in conjunction with the accompanying drawings. In the drawings, like numbers refer to like elements unless stated otherwise.

DETAILED DESCRIPTION

A vehicle warning system receives input over time from a variety of sources that detect one or more remote vehicles and determines whether there is a possibility of collision. The possibility of collision is based on, for example, the speed and heading of both a host vehicle with which the vehicle warning system is associated and one or more remote vehicles. If a remote vehicle and the host vehicle will each reach a converging point within a defined time absent a change in operation of either, an alert or warning will issue from the vehicle warning system. For example, an alert will issue if the vehicles will reach the converging point within two seconds, four seconds, or some other value, of each other. The terms alert and warning may be used interchangeably herein.

Using a single defined time for issuing the alert can cause problems in that the alert may fluctuate or oscillate over time. That is, new information is received over time, and the calculations regarding the possibility of collision are performed repeatedly. Small changes in the relative speed and/or direction of a host and remote vehicle can result in the alert activating and deactivating over a short period of time. Even where the relative speed and direction are unchanged, the normal uncertainties of GPS location can cause such fluctuations. Driver annoyance may result.

According to the teachings herein, fluctuating warnings or alerts are suppressed while operating a (e.g., host) vehicle. While the discussion references warnings or alerts as an example, the teachings are applicable to other signals that modify operation of a host vehicle responsive to vehicle warning systems, such as automatic braking, as discussed in more detail herein.

Figure 1:
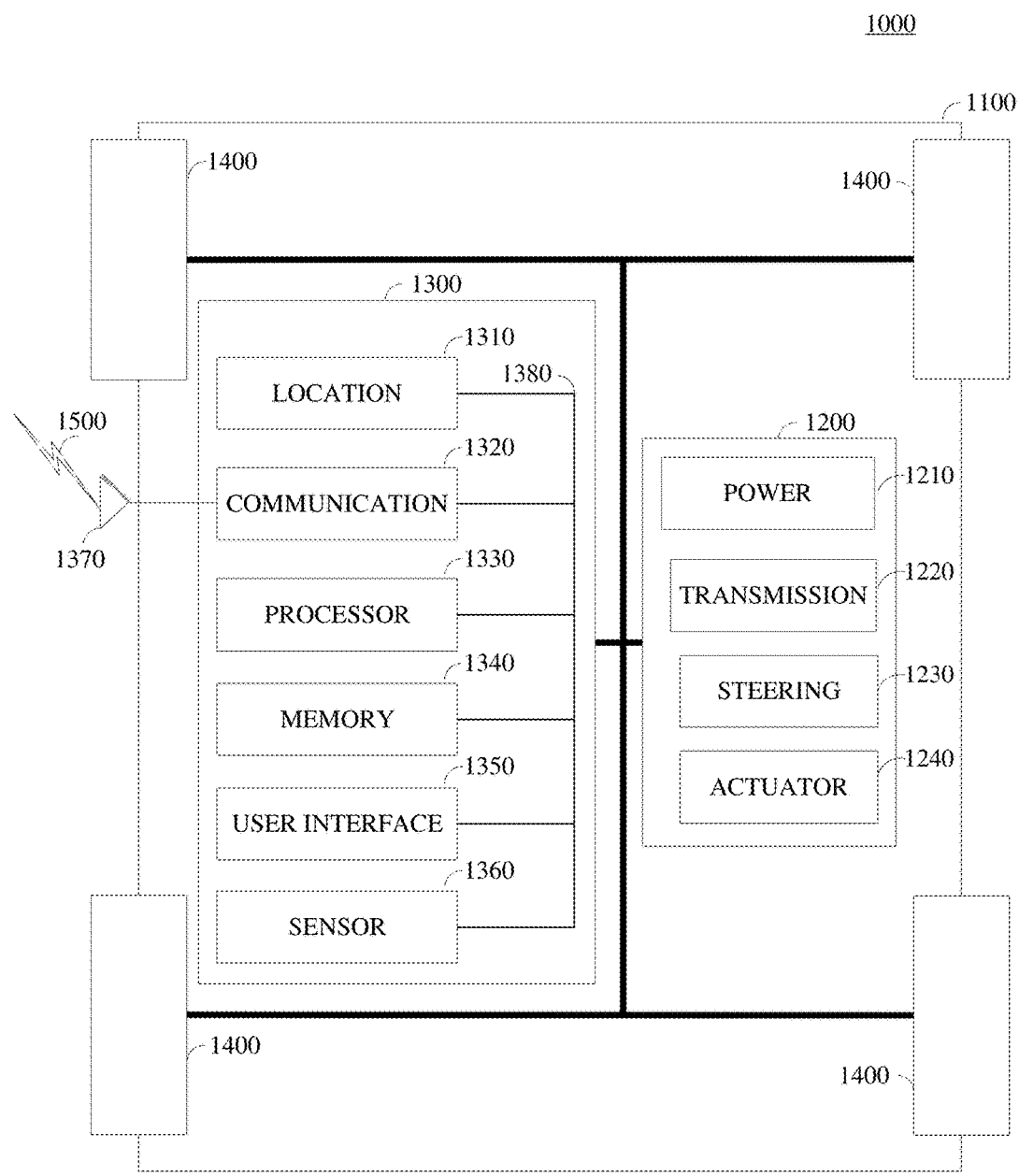
FIG. 1 is a diagram of an example of a vehicle in which the teachings herein may be incorporated.

FIG. 1 is a diagram of an example of a vehicle in which the aspects, features, and elements disclosed herein may be implemented. A vehicle 1000 includes a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400, or both, to control the vehicle 1000, which can include accelerating, decelerating, steering, or otherwise controlling the vehicle 1000.

The powertrain 1200 includes a power source 1210, a transmission 1220, a steering unit 1230, an actuator 1240, or any other element or combination of elements of a powertrain, such as a suspension, a drive shaft, axles, or an exhaust system. Although shown separately, the wheels 1400 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor is operatively coupled with the memory 1340 via a communication bus 1380.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via a wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single electronic communication unit 1320 and a single electronic communication interface 1370, any number of communication units and any number of communication interfaces may be used. In some embodiments, the electronic communication unit 1320 can include a dedicated short range communications (DSRC) unit, a wireless safety unit (WSU), or a combination thereof.

The location unit 1310 may determine geolocation information, such as longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensors 1360 can provide information regarding current operating characteristics of the vehicle. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 may include sensors that are operable to obtain information regarding the physical environment surrounding the vehicle 1000. For example, one or more sensors detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, in some embodiments, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
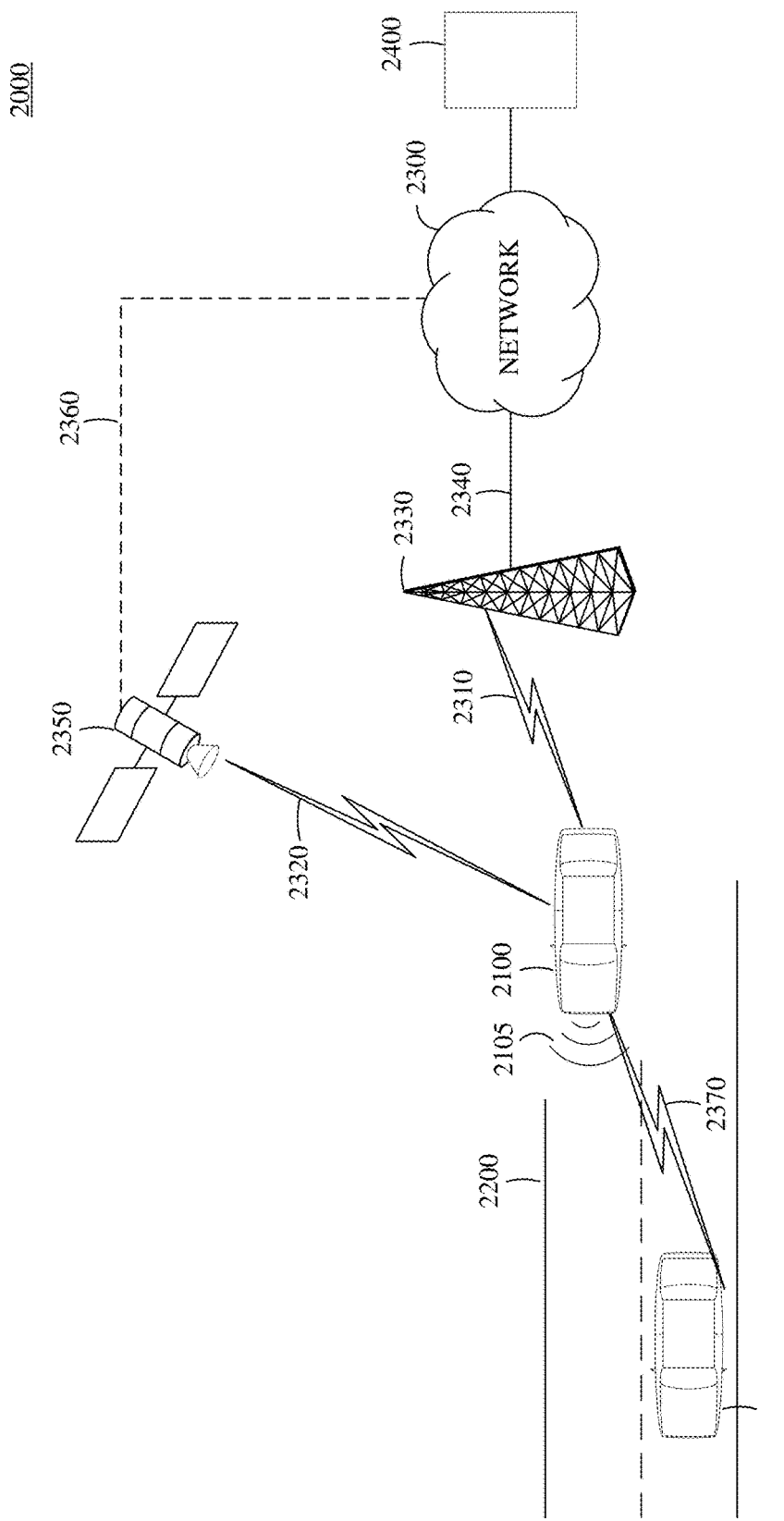
FIG. 2 is a diagram of an example of a portion of a vehicle transportation and communication system.

FIG. 2 is a diagram of an example of a portion of a vehicle transportation and communication system in which the aspects, features, and elements disclosed herein may be implemented. The vehicle transportation and communication system 2000 includes one or more vehicles 2100/2110, such as the vehicle 1000 shown in FIG. 1, which may travel via one or more portions of one or more transportation networks 2200, and may communicate via one or more electronic communication networks 2300. Although not explicitly shown in FIG. 2, a vehicle may traverse an area that is not expressly or completely included in a transportation network, such as an off-road area.

The electronic communication network 2300 may be a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the transportation network 2200, from a communication device 2400 via the electronic communication network 2300.

In some embodiments, a vehicle 2100/2110 communicates via a wired communication link (not shown), a wireless communication link 2310/2320/2370, or a combination of any number of wired or wireless communication links. For example, as shown, a vehicle 2100/2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle 2100 may receive one or more automated inter-vehicle messages, such as a basic safety message (BSM), from a remote, or target, vehicle 2110, via a direct communication link 2370, or via an electronic communication network 2300. For example, the remote vehicle 2110 may broadcast the message to host vehicles within a defined broadcast range, such as 300 meters. In some embodiments, the host vehicle 2100 receives a message via a third party, such as a signal repeater (not shown) or another remote vehicle (not shown). In some embodiments, a vehicle 2100/2110 transmits one or more automated inter-vehicle messages periodically based on a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with one or more communication devices 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. A satellite 2350, which may include a computing device, may be configured to communicate with a vehicle 2100, with the electronic communication network 2300, with one or more communication devices 2400, or with a combination thereof via one or more communication links 2320/2360. Although shown as a single unit, a satellite can include any number of interconnected elements.

An electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, a vehicle 2100 identifies a portion or condition of the transportation network 2200. For example, the vehicle may include one or more on-vehicle sensors 2105, such as sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

A vehicle 2100 may traverse a portion or portions of one or more transportation networks 2200 using information communicated via the electronic communication network 2300, such as information representing the transportation network 2200, information identified by one or more on-vehicle sensors 2105, or a combination thereof. The vehicle 2110 may be capable of all or only some of the communications and actions described above with respect to the vehicle 2100.

For simplicity, FIG. 2 shows the vehicle 2100 as the host vehicle, the vehicle 2110 as a remote vehicle, one transportation network 2200, one electronic communication network 2300, and one communication device 2400. However, any number of vehicles, networks, or computing devices may be used. In some embodiments, the vehicle transportation and communication system 2000 includes devices, units, or elements not shown in FIG. 2. Although each vehicle 2100/2110 is shown as a single unit, a vehicle can include any number of interconnected elements.

Although the vehicle 2100 is shown communicating with the communication device 2400 via the electronic communication network 2300, the vehicle 2100 (and vehicle 2110) may communicate with the communication device 2400 via any number of direct or indirect communication links. For example, the vehicle 2100/2110 may communicate with the communication device 2400 via a direct communication link, such as a Bluetooth communication link.

As explained briefly above, a host vehicle and a remote vehicle may have a converging point within a transportation network, i.e., a point where their paths will cross. When the vehicles will reach that converging point within a first amount of time of each other, i.e., the difference between arrival times is less than a first threshold, operation of the host vehicle is modified as discussed in additional detail below. Conditions that would otherwise cause fluctuations in the start and stop of the modified operation, when the modified operation should be maintained, are avoided through a multi-step analysis. Similarly, when the modified operation should end, it ends without fluctuations.

According to the teachings herein, after the host vehicle operation is modified by the converging time being below the first threshold, it is determined whether the next calculation of the converging time would still result in the modified operation (i.e., the converging time is again below the first threshold). If so, the modified operation is maintained. If the next calculation of the converging time would end the modified operation (i.e., the converging time is below a second threshold that is higher than the first threshold due to hysteresis), the modified operation would not end.

Instead, the modified operation would continue until a defined number of data (also called sampling) points passes with no threat, that is, the converging time is below the second threshold for the defined number of sampling points in a row. If there are no threats for the defined number of sampling points, the modified operation ends. If a next calculation shows a threat, but defined number of sampling points has not been reached, the modified operation could still end if an operation of the remote vehicle changes such that the threat will no longer exist in due course. This could happen, for example, where the heading of the remote vehicle has changed such that it is moving away from the host vehicle. If the operation of the remote vehicle has not changed, the next data point (and consequently the next convergence time) is considered while the modified operation continues.

There are a number of operational sequences that can be used to implement the host vehicle operations described above. One is shown by example in FIG. 3.

Figure 3:
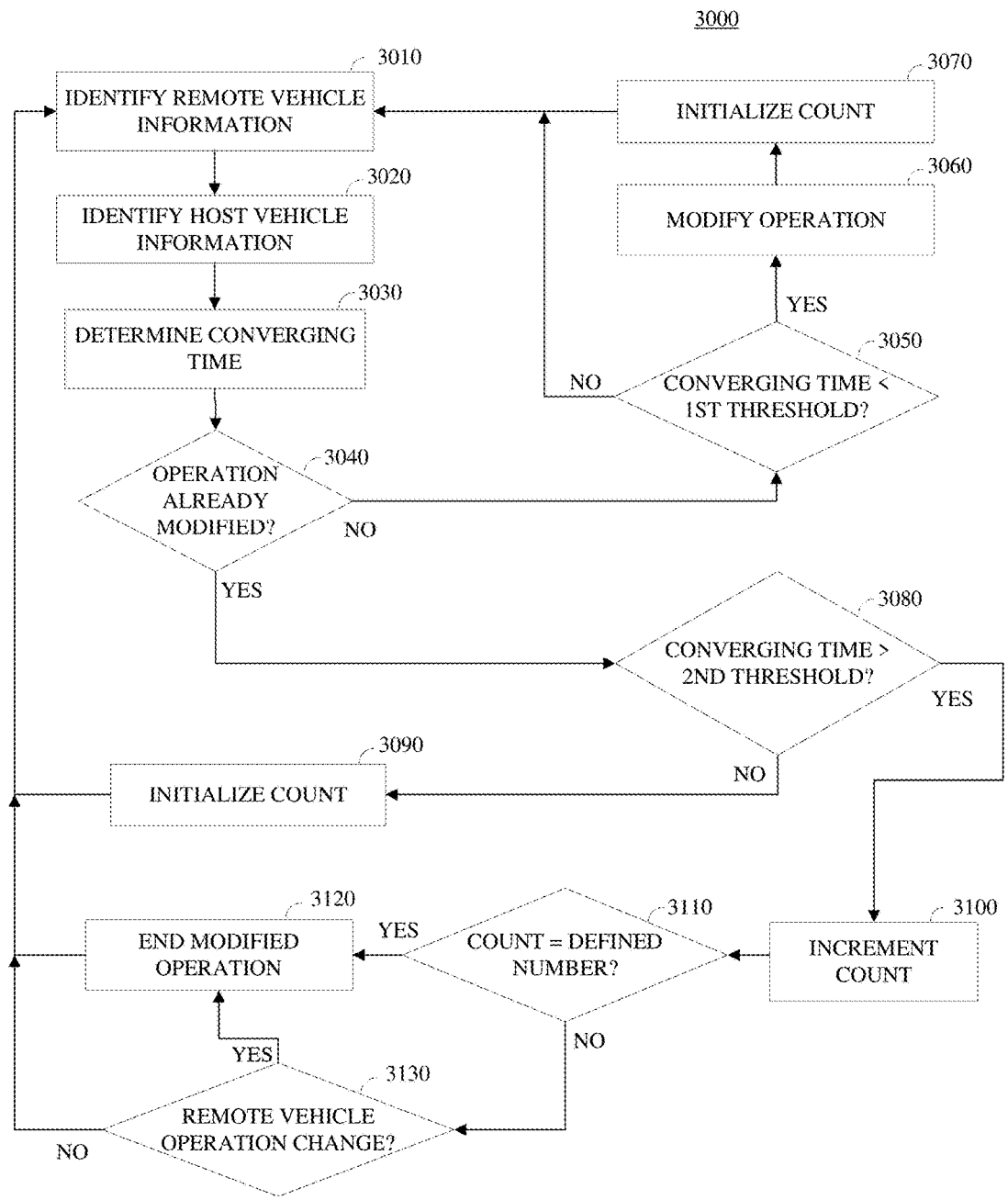
FIG. 3 is a flowchart of a method of operating a vehicle according to the teachings herein.

FIG. 3 is a flowchart of a method 3000 of operating a vehicle according to the teachings herein. The vehicle is also called a host vehicle herein. In some embodiments, the method 3000 is implemented in a vehicle, such as the vehicle 1000 shown in FIG. 1 or the vehicles 2100 shown in FIG. 2. In other embodiments, the method is implemented in whole or in part external of the vehicle, such as within one or more processors of communication device 2400, with transmission of relevant information, such as remote vehicle information, to the host vehicle.

Either before or during the method 3000 of FIG. 3, transportation network information related to a transportation network in which the host vehicle is traveling is identified either by or for the host vehicle. The transportation network information may be identified from a storage device local to the host vehicle or may be transmitted from a source outside of the host vehicle. Transportation network information may represent one or more unnavigable areas, such as buildings, one or more partially navigable areas, such as a parking area, one or more navigable areas, such as roads, or a combination thereof. The transportation network information may also include one or more interchanges between one or more navigable, or partially navigable, areas. A road may include one or more lanes, and may be associated with one or more directions of travel. Lanes can be marked or unmarked.

Transportation network information may be expressed as a hierarchy of elements, such as markup language elements, which may be stored in a database or file. For simplicity, this disclosure depicts transportation network information representing portions of the transportation network as diagrams or maps; however, transportation network information may be expressed in any computer-usable form capable of representing a transportation network, or a portion thereof. In some embodiments, the transportation network information includes transportation network control information, such as direction of travel information, speed limit information, toll information, grade information, such as inclination or angle information, surface material information, aesthetic information, or a combination thereof.

Figure 4:
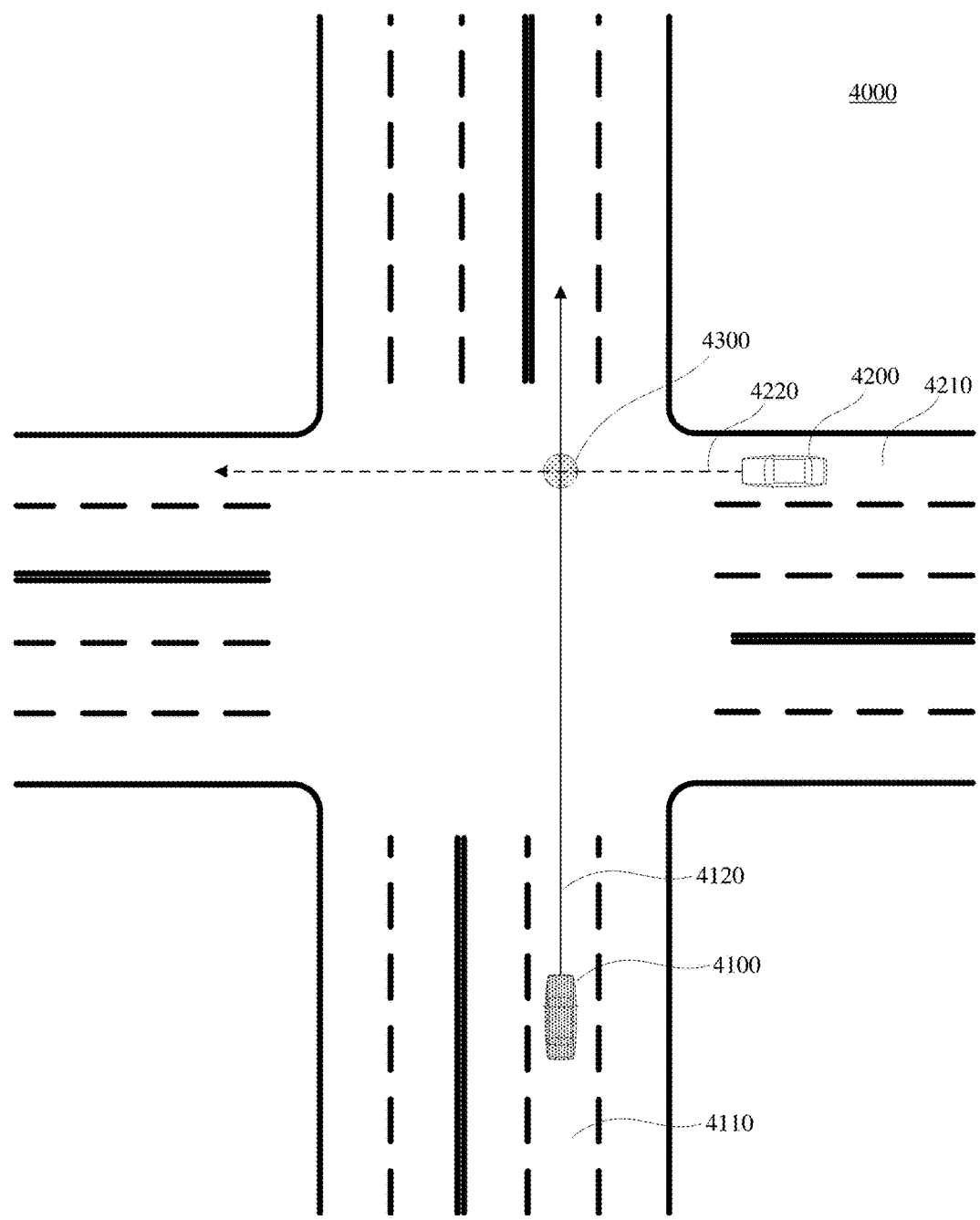
FIG. 4 is a diagram of determining a converging time within a transportation network.

Examples of transportation network 4000 information may be seen in FIG. 4 by example. As shown, the transportation network 4000 information generally includes lanes 4110, 4210 in which a host vehicle 4100 and one or more remote vehicles 4200 are traveling, as well as successor and predecessor lanes to the current lane and any adjacent lanes (also referred to as sibling lanes) that are within a defined geospatial range. The defined geospatial range may be a fixed value or may be variable based on the traveling speed of the host vehicle. As one example, the defined geospatial range is 300 meters.

Referring again to FIG. 3, remote vehicle information is identified at 3010. Herein, identify and its variations mean to obtain, receive, or otherwise identify the remote vehicle information. In some implementations, the host vehicle identifies the remote vehicle information at 3010 from a remote vehicle message sent by a remote vehicle, such as from the remote vehicle 4200 shown in FIG. 4 or the remote vehicle 2110 shown in FIG. 2, via a communication link, such as the wireless electronic communication link 2370 shown in FIG. 2. The information may be identified in whole or in part through dedicated short-range communications (DSRC) in V2V and vehicle-to-infrastructure (V2I) short-range wireless communications, for example. In other embodiments, the remote vehicle information is identified from signals received from the communication device 2400 through the electronic communication network 2300, including the satellite 2350 or the access point 2330. In some embodiments, the host vehicle stores the remote vehicle information. For example, the host vehicle stores the remote vehicle information in a memory of the host vehicle, such as the memory 1340 shown in FIG. 1. The remote vehicle information identified over time may be stored with timestamps.

Although one technique involves receiving remote vehicle information from a remote vehicle message sent by a remote vehicle, the particular technique of receiving the remote vehicle information is not so limited. That is, the remote vehicle information may include a geospatial state and a kinematic state for the remote vehicle. In some embodiments, for example, the geospatial state includes geospatial coordinates for the remote vehicle, such as longitude and latitude coordinates that can be converted to map coordinates. The kinematic state may include a remote vehicle velocity for the remote vehicle, a remote vehicle heading for the remote vehicle, a remote vehicle acceleration for the remote vehicle, or a remote vehicle yaw rate for the remote vehicle, or any other information, or combination of information, relevant to the operational state of the remote vehicle. As a result, identifying the remote vehicle information may be achieved by a variety of techniques that either provide the remote vehicle information directly or provide information from which the remote vehicle information may be determined.

For example, remote vehicle information may be identified from a location of an infrastructure device in the transportation network. Such infrastructure devices may include smart devices such as a traffic light, a road sensor, a road camera, or any other non-vehicle device associated with the transportation network and capable of detecting a vehicle. Remote vehicle information may also be received from a portable device while it is associated with a vehicle. For example, a portable device, such as a smartphone, carried by a passenger of the vehicle includes geographic location information, such as GPS or assisted GPS (AGPS) information and may include information associating the passenger with the vehicle.

The identification of remote vehicle information is not limited to any particular technique provided that the technique can associate the information with the particular remote vehicle. For example, SONAR, RADAR, and/or LIDAR mounted on the host vehicle, remote vehicle(s) or infrastructure device(s) may provide input that can be used to calculate or otherwise generate the remote vehicle information.

The host vehicle information identified at 3020 includes a geospatial state and/or a kinematic state for the host vehicle. Like the remote vehicle information, the geospatial state for the host vehicle may include geospatial coordinates, such as longitude and latitude coordinates. In some embodiments, the kinematic state includes a host vehicle velocity for the host vehicle, a host vehicle heading for the host vehicle, a host vehicle acceleration for the host vehicle, or a host vehicle yaw rate for the host vehicle, or any other information, or combination of information, relevant to the operational state of the host vehicle. When the method 3000 is performed at the host vehicle, the host vehicle may use its on-board sensor information, such as from sensors 1360 and/or location unit 1310 of FIG. 1, to identify the host vehicle information. Alternatively, or additionally, host vehicle information may be identified from signals from the communication device 2400 or other devices such as those discussed with respect to the remote vehicle information.

A converging time to a converging location within the transportation network is determined at 3030 based on the remote vehicle information and the host vehicle information. This may include determining expected paths of the remote vehicle and the host vehicle, determining the converging location based on the expected paths, and determining the converging time based on the converging location. Determining the converging time, and the other expected paths of the remote vehicle and the host vehicle may be implemented in a host vehicle, such as the vehicle 1000 shown in FIG. 1 or the host vehicle 2100 (FIG. 2), 4100 (FIG. 4), or may be implemented remotely with the results transmitted to one or more of the vehicles such as the host vehicle 4100. In some embodiments, one or more of the vehicles within a transportation network, including a remote vehicle, a host vehicle, or both, may be stationary or may be in motion.

FIG. 4 is a diagram of determining a converging time within a transportation network. Initially, and in this example, the expected paths or trajectories are determined based on automated inter-vehicle messages. However, this is not necessary—any source of the remote vehicle spatial and kinetic information and the host vehicle spatial and kinetic information may be used to determine the expected paths or trajectories. The host vehicle is shown with stippling, and remote vehicle is shown in white. For simplicity and clarity, the diagram shown in FIG. 4 is oriented with north at the top and east at the right side.

As shown in FIG. 4, the host vehicle 4100 traverses a portion of the transportation network 4000, receives automated inter-vehicle communications from one or more remote vehicles 4200 within the defined geospatial range, and transmits automated inter-vehicle communications to one or more remote vehicles 4200 within the defined geospatial range. An automated inter-vehicle communication received by a host vehicle from a remote vehicle may be referred to herein as a remote vehicle message. For example, the host vehicle 4100 receives the remote vehicle messages via a wireless electronic communication link, such as the direct communication link 2370 shown in FIG. 2.

The automated inter-vehicle messages may indicate information such as geospatial location information and heading information. In some embodiments, the host vehicle 4100 transmits one or more automated inter-vehicle messages including host vehicle information, such as host vehicle heading information. For example, as shown in FIG. 4, the host vehicle heading information indicates that the host vehicle 4100 is heading straight north. In some embodiments, a remote vehicle 4200 transmits one or more automated inter-vehicle messages including remote vehicle information, such as remote vehicle heading information. For example, the remote vehicle heading information indicates that the remote vehicle 4200 is heading straight west in FIG. 4.

The host vehicle 4100 identifies a host vehicle expected path 4120 for the host vehicle 4100 based on host vehicle information, such as a geospatial state and a kinematic state. The host vehicle 4100 may also identify a remote vehicle expected path 4220 for the remote vehicle 4200 based on the automated inter-vehicle messages, which include remote vehicle information such as a geospatial state and a kinematic state for the remote vehicle 4200. For example, the remote vehicle messages transmitted by the remote vehicle 4200 in FIG. 4 indicate that the remote vehicle 4200 is heading west, and the host vehicle 4100 may identify the remote vehicle expected path 4220 for the remote vehicle 4200. In another example, the remote vehicle messages include navigation information, such as turn signal information indicating a left or right turn.

The heading and expected path of the host vehicle 4100 are shown by a solid directional line, and the heading and expected path 4220 of the remote vehicle are shown by a broken directional line. How an expected path is determined is not particularly critical here. In one implementation, the heading and speed of a vehicle are used to project the position of the vehicle at certain points in the future, i.e., the expected path, such as at one second intervals.

A converging location 4300 is determined based on the expected paths. A converging location is a common location at which a host vehicle and a remote vehicle pass. From the converging location, a time may be calculated for each of the host vehicle 4100 and the remote vehicle 4200, which is the time at which each vehicle will reach the converging location 4300. The time may be determine using the current information for each vehicle. In an example, the time for the host vehicle 4100 is determined using the speed and current location of the host vehicle 4100 relative to the converging location or point 4300. Similarly, the time for the remote vehicle 4200 may be determined using the speed and current location of the remote vehicle 4200 relative to the converging location or point 4300. The difference in these times is the converging time determined at 3030.

This description uses an example where the host vehicle and remote vehicle are approaching an intersection within the transportation network 4000 as shown in FIG. 4. This is only one example of a transportation network in which a converging time may result. For example, the transportation network of FIG. 2 shows the host vehicle 2100 and the remote vehicle 2110 traveling in the same direction. If either vehicle changes lanes, the expected paths may result a converging location, depending upon relative speeds and steering angles, from which a converging time can be determined. If the host vehicle 2100 and the remote vehicle 2110 were traveling in the same lane, speeding up of the host vehicle 2100, slowing down of the remote vehicle 2110, or both, may result in a converging location having a converging time that makes modified operation desirable.

Referring again at FIG. 3, whether or not the operation of the host vehicle is already modified is queried at 3040. If the operation of the host vehicle has not been modified, it is checked whether the converging time is less than the first threshold at 3050. If the converging time is not less than the threshold at 3050, the method of FIG. 3 repeats for the next sampling point. That is, the next converging time is determined at 3040 based on identifying the remote vehicle information at 3010 and the host vehicle information at 3020. More specifically, identifying the remote and host vehicle information, and hence determining converging time as shown in FIG. 3 is performed repeatedly, preferably on a periodic basis such as once every 100 ms, or more or less frequently. The repeated instances of the identification of remote and host vehicle information from which the converging time is determined may be referred to as sampling points. Some or all of the sampling points may form a sequence of sampling points.

If the converging time is less than the first threshold at 3050, the operation of the host vehicle is modified at 3060, and a count is initialized at 3070 before the next sampling point is considered. The count may be implemented using a counter in certain implementations. Modifying the operation of the host vehicle at 3060 may include issuing an informative advisory to the operator of the host vehicle using an audio output device, a visual output device, or both. In some implementations, modifying the operation of the host vehicle at 3060 includes issuing a warning to the operator of the host vehicle using an audio output device, a visual output device, or both.

Operation of the host vehicle may be modified at 3060 by other actions responsive to the converging time reaching the threshold. These actions may be performed automatically by signals from the processor of the host vehicle to one or more powertrain components, such as the processor 1330 of FIG. 1, either alone or in combination with actions by the operator. In an example, for an operator of a vehicle to bring the vehicle to a stop before reaching the converging location, such as the intersection of two crossing vehicle paths shown in FIG. 4, the operator may apply a brake force to the host vehicle to modify its operation. An automatic braking system may also apply a brake force to the host vehicle. In some cases, modifying the steering angle of the host vehicle (e.g., through signals to the steering unit 1230 of FIG. 1) so as to move or eliminate the converging location with the remote vehicle may also occur. In other words, the threshold may be or include a control threshold that triggers operational changes to the host vehicle in addition to or instead of one or more warnings.

According to 3010-3070, operation of the host vehicle is modified to a modified operation responsive to the converging time, having been above the first threshold, falling below the first threshold. Moreover, a counter is initialized responsive to the converging time falling below the first threshold. Finally, while the converging time remains above the first threshold, sampling continues without modifying the host vehicle operation.

The modified operation of the host vehicle will be maintained under certain circumstances. For example, the modified operation of the host vehicle may be maintained until the converging time remains above a second threshold higher than the first threshold for a defined number of contiguous sampling points of a sequence. This is shown next in FIG. 3 starting at 3040.

That is, when the operation of the host vehicle is already modified at 3040, the method 3000 advances to 3080 to determine whether or not the converging time for the current sampling point is greater than the second threshold. In this example, the second threshold is 25% higher than the first threshold, but other multipliers are possible. For example, the first threshold may be a warning threshold of between two to four seconds, inclusive, while the second value is a hysteresis threshold at least one second higher than the warning threshold. If the converging time is not greater than the second threshold at 3080, that is, the converging time falls below the second threshold, the count is initialized (e.g., re-initialized) at 3090 before the next sampling point is considered starting at 3010. The second threshold provides hysteresis in the determination as to whether to start or end modified operation of the host vehicle. Therefore, unless the converging time is greater than the second threshold, the modified operation should continue.

If the converging time is greater than the second threshold at 3080, then there is a possibility that the modified operation can end. The count is incremented at 3100, and the count is compared to a defined number of contiguous sampling points at 3110. The defined number of contiguous sampling points in this example is ten (10) sampling points. Other numbers of sampling points may be used. In one example, more frequent sampling results in a larger count threshold, while less frequent sampling results in a smaller count threshold. Alternatively or additionally, the defined number is based on a speed of the host vehicle such that fewer points are considered as the speed of the host vehicle increases. If the count is equal to the defined number of contiguous sampling points at 3110, the modified operation ends at 3120 before the next sampling point is considered starting at 3010.

If the count has not reached (and hence is not equal to) the defined number of contiguous sampling points at 3110, the method 3000 may proceed directly to consider the next sampling point starting at 3010. In the example shown in FIG. 3, however, a further innovation that may reduce computations is introduced. That is, if the count is not equal to the defined number of contiguous sampling points at 3110, the method 3000 advances to 3130, where a query is made as to whether the remote vehicle operation has changed. More specifically, if the remote vehicle information indicates that the remote vehicle is no longer on a converging path with the host vehicle, the modified operation can end at 3120. This can occur if, for example, the steering direction of the host vehicle has changed resulting in a lane switch. This can also occur if the host vehicle has moved to a parking location, i.e., has slowed to a stop. If the remote vehicle has not had an operation change at 3130, the method 3000 proceeds directly to consider the next sampling point starting at 3010. In this way, the modified operation of the host vehicle is maintained until the converging time remains above a second threshold higher than the first threshold for a defined number of contiguous sampling points of a sequence or until the remote vehicle information indicates that the remote vehicle is no longer on a converging path with the host vehicle, whichever occurs first.

FIGS. 5A-8B are graphs that illustrate the application of the teachings herein to operation of a host vehicle. The graphs are plotted over 5 seconds of travel. The first threshold is 2 seconds, and the second threshold is 2.5 seconds, 25% above the first threshold. It is assumed that the remote vehicle operation does not change over the travel period. The converging time is shown for each of a sequence of sampling points occurring every 0.1 seconds.

Figure 5A:
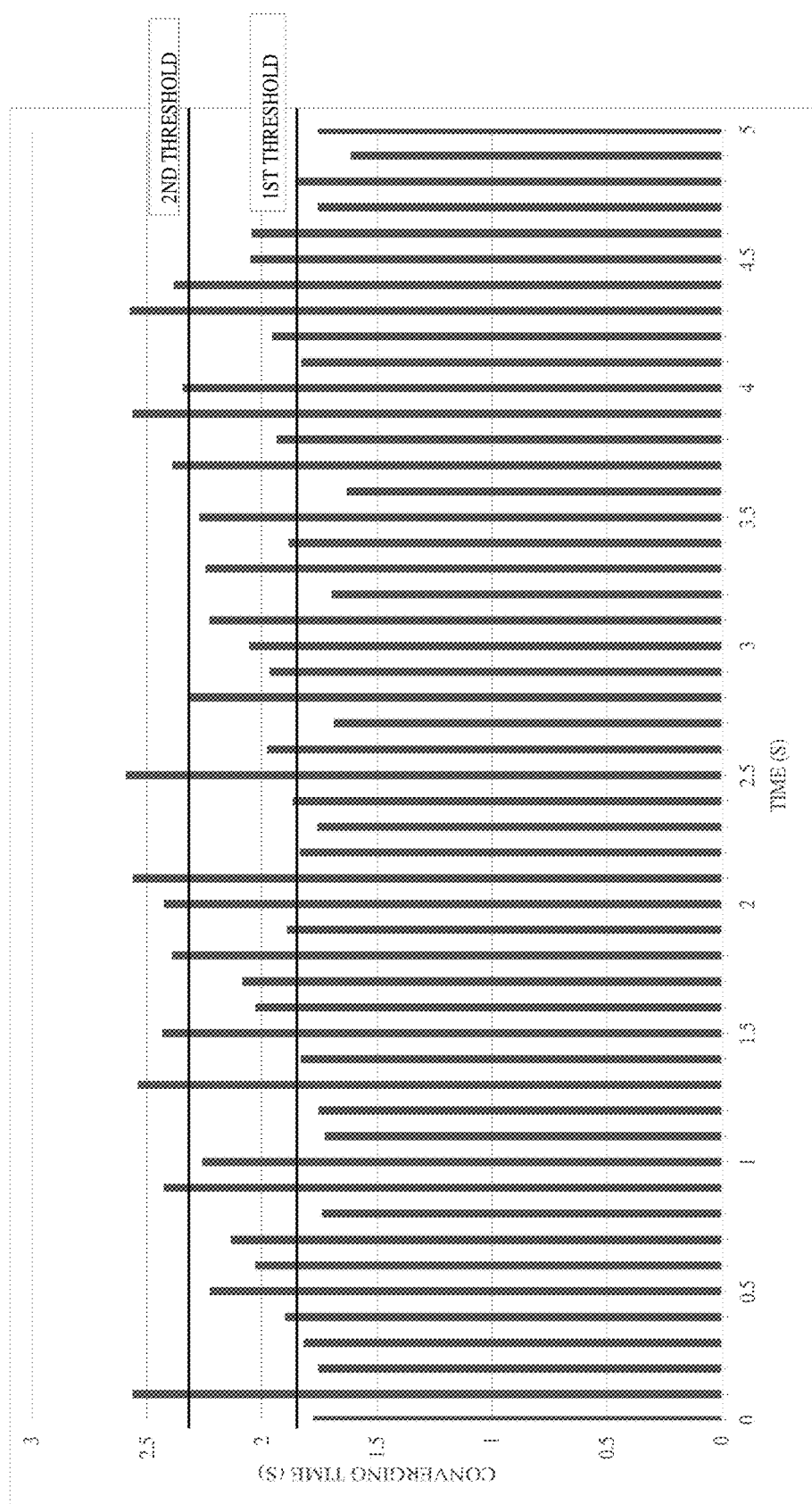
FIG. 5A is a graph of a converging time compared to a first threshold and a second threshold in a first example.
Figure 5B:
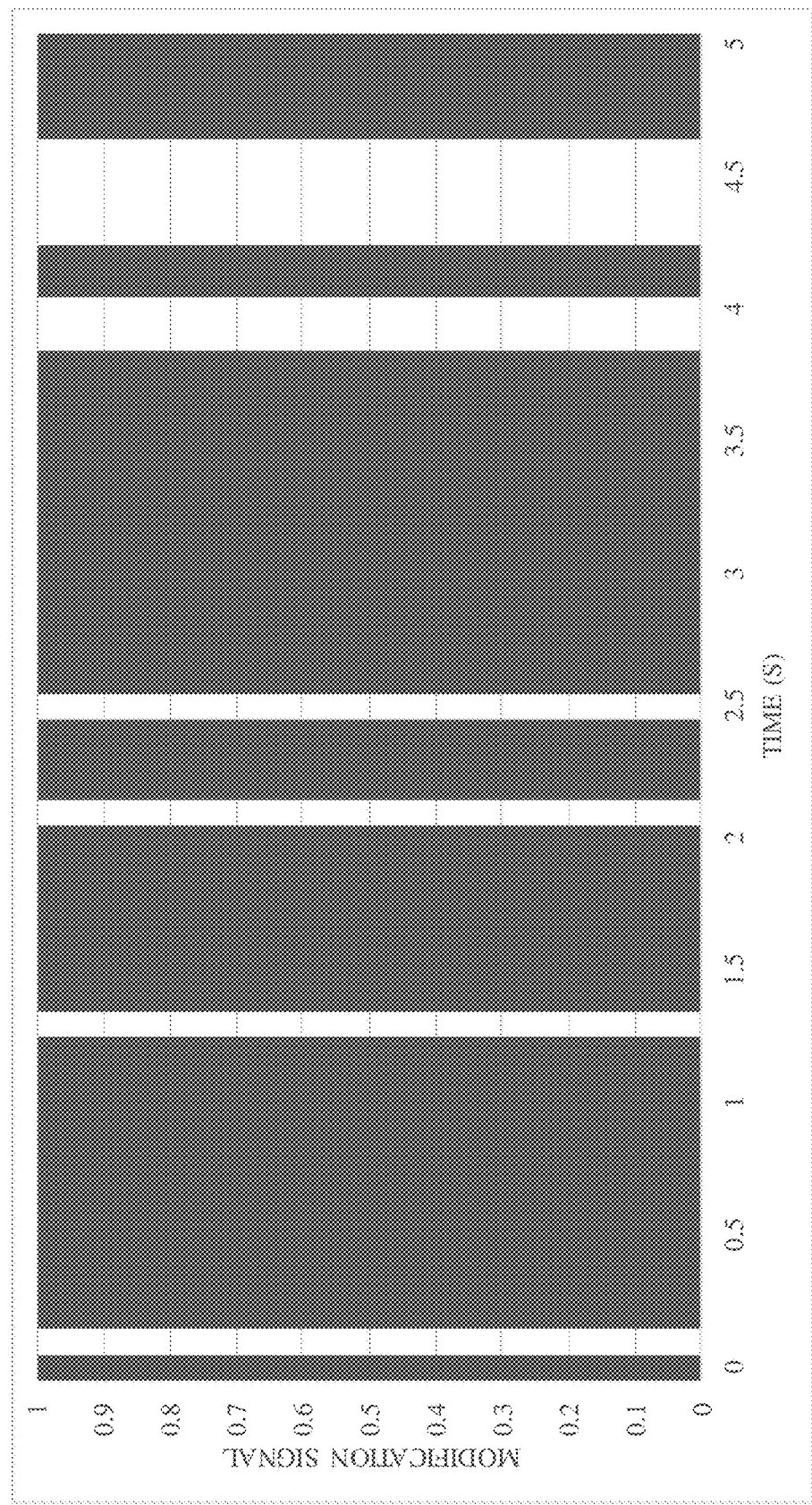
FIG. 5B is a graph of an operation of the host vehicle resulting from the graph of FIG. 5A in the absence of a sampling point count.

Referring first to FIG. 5A, which is a graph of a converging time compared to a first threshold and a second threshold in a first example. FIG. 5B is a graph of an operation of the host vehicle resulting from the graph of FIG. 5A in the absence of a sampling point count. That is, FIG. 5B shows the modification signal for the operation of the host vehicle over the same travel period of FIG. 5A using only the hysteresis provided by the second threshold. As explained above, the modified operation is initiated or activated responsive to the converging time falling below the first threshold, and is ended or deactivated responsive to the converging time exceeding the second value. This results in fluctuations in the operation of the vehicle when, as can be seen from FIG. 5A, the modified operation of the vehicle should continue over the whole period. For example, an audio warning may drop out at 1.3 seconds, 2.1 seconds, 2.5 seconds, 3.8-4.0 seconds, and 4.3-4.6 seconds.

Figure 5C:
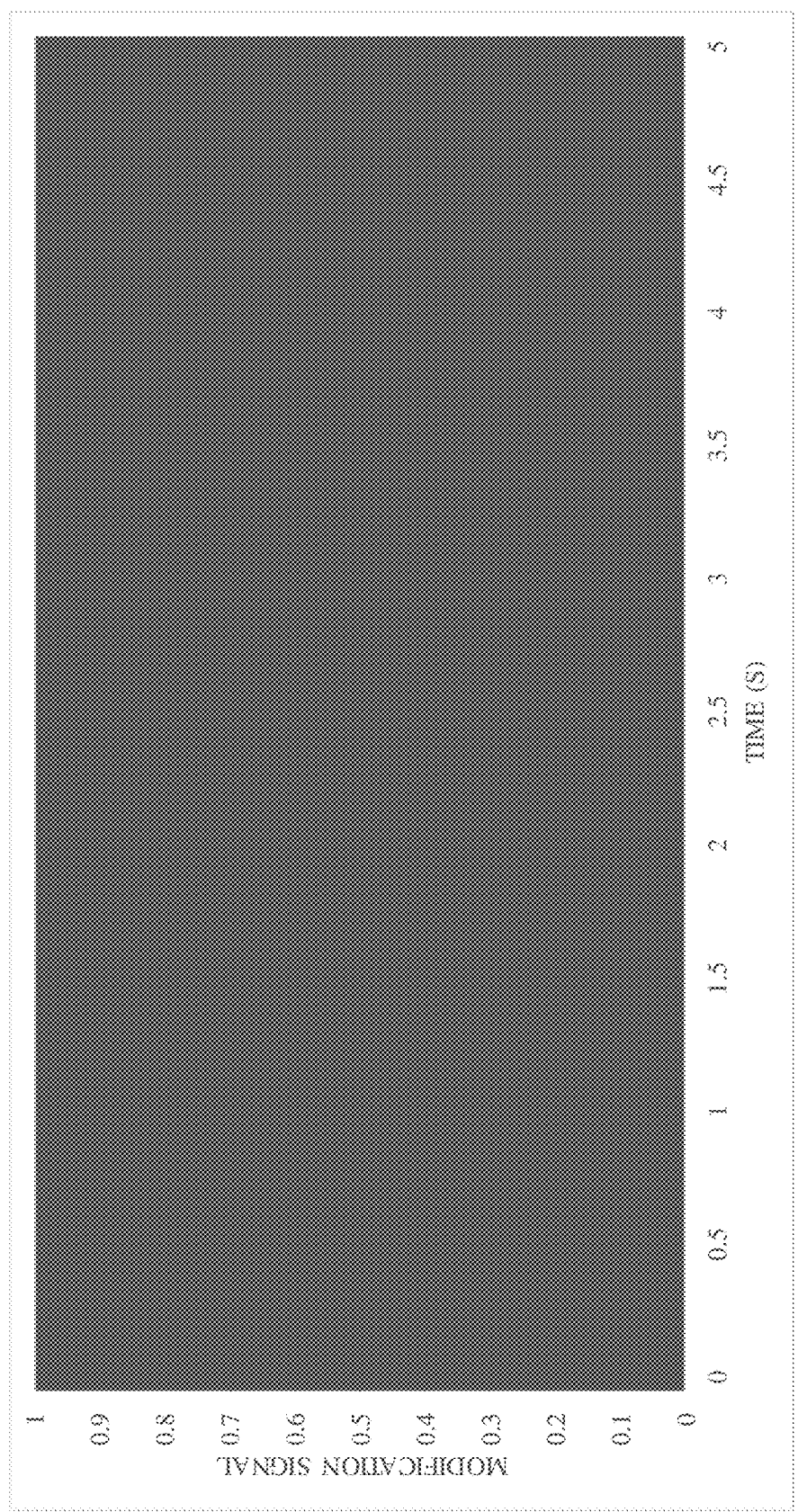
FIG. 5C is a graph of an operation of the host vehicle resulting from the graph of FIG. 5A with the inclusion of a sampling point count.

In contrast, FIG. 5C is a graph of an operation of the host vehicle resulting from the graph of FIG. 5A with the inclusion of a sampling point count. Referring to the method 3000, once the modified operation begins at 0 seconds, the answer to the query at 3040 is yes. While the converging time remains below the second threshold in response to the query at 3080, a count is re-initialized at 3090 for each sampling point. When the converging time exceeds the second threshold in response to the query at 3080, the count is incremented at 3100. However, the count of contiguous sampling points above the second threshold never reaches the defined number of 10 counts at 3110, nor does the remote vehicle operation change at 3130. Hence, the modified operation continues over the travel period (i.e., the method 3000 does not reach 3120 over the 5-second period).

Figure 6A:
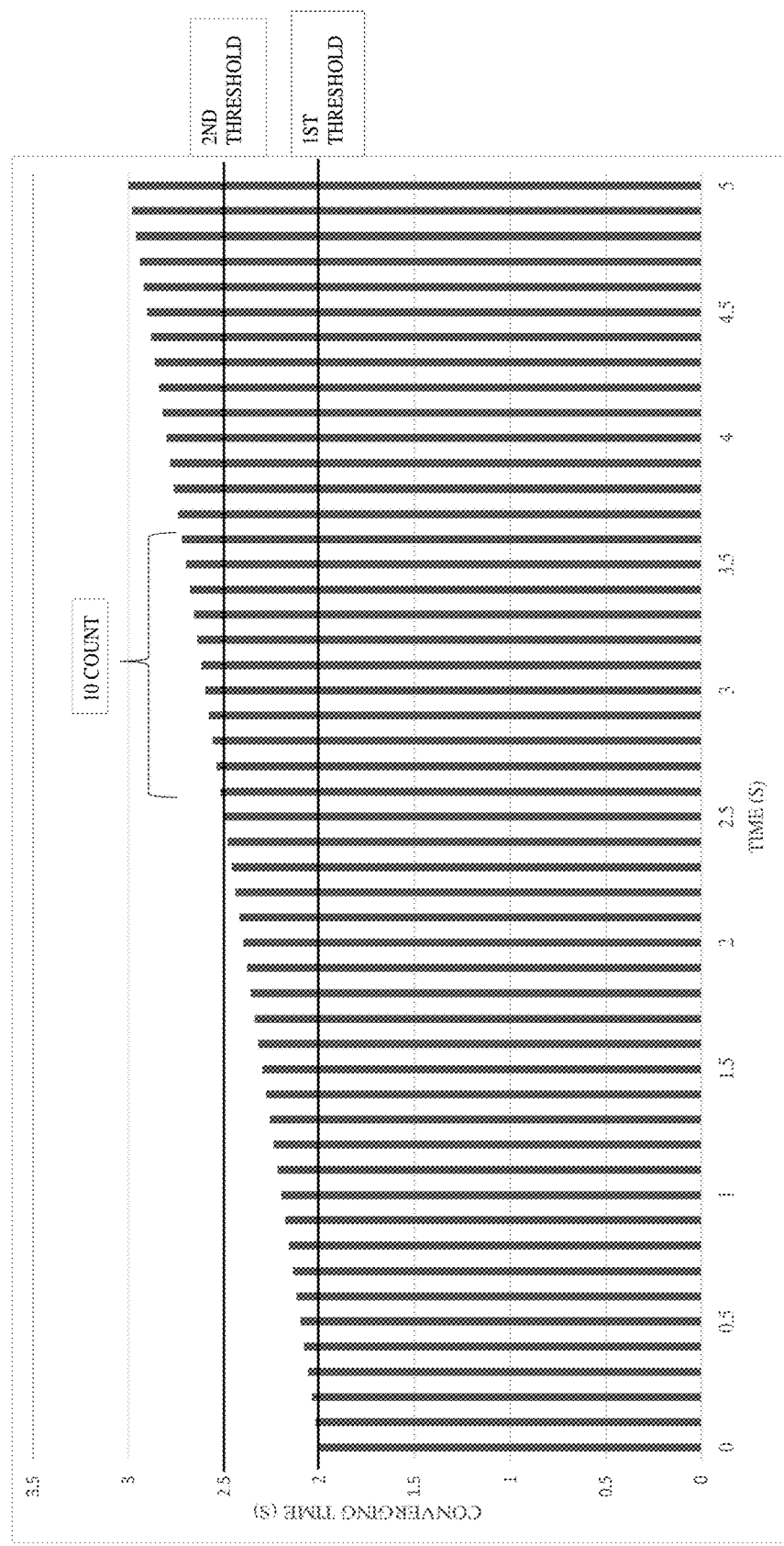
FIG. 6A is a graph of a converging time compared to a first threshold and a second threshold in a second example.
Figure 6B:
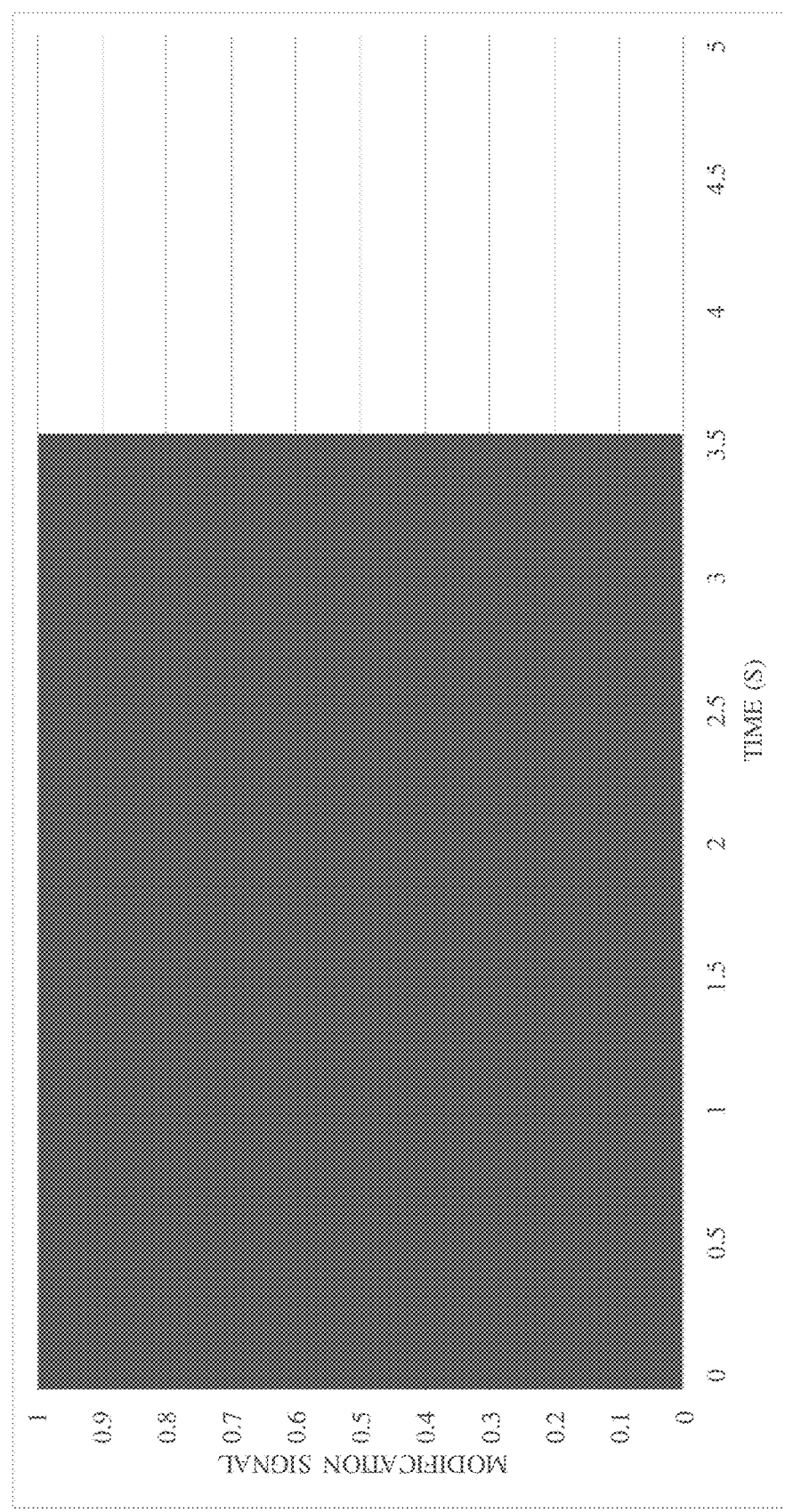
FIG. 6B is a graph of an operation of the host vehicle resulting from the graph of FIG. 6A with the inclusion of a sampling point count.

FIG. 6A is a graph of a converging time compared to a first threshold and a second threshold in a second example. This graph may represent one or the other of the host vehicle or remote vehicle slowing down while still heading in the direction of the converging point. FIG. 6B is a graph of an operation of the host vehicle resulting from the graph of FIG. 6A with the inclusion of a sampling point count. Referring again to the method 3000, once the modified operation begins at 0 seconds, the answer to the query at 3040 is yes. While the converging time remains below the second threshold in response to the query at 3080, a count is re-initialized at 3090 for each sampling point. When the converging time first exceeds the second threshold at about 2.5 seconds in response to the query at 3080, the count is incremented at 3100. Unlike FIGS. 5A and 5C, however, the count of contiguous sampling points above the second threshold reaches the defined number of 10 counts at 3110. As a result, the method 3000 proceeds to 3120 to end the modified operation at about 3.5 seconds after the defined number of contiguous sampling points is reached.

Figure 7A:
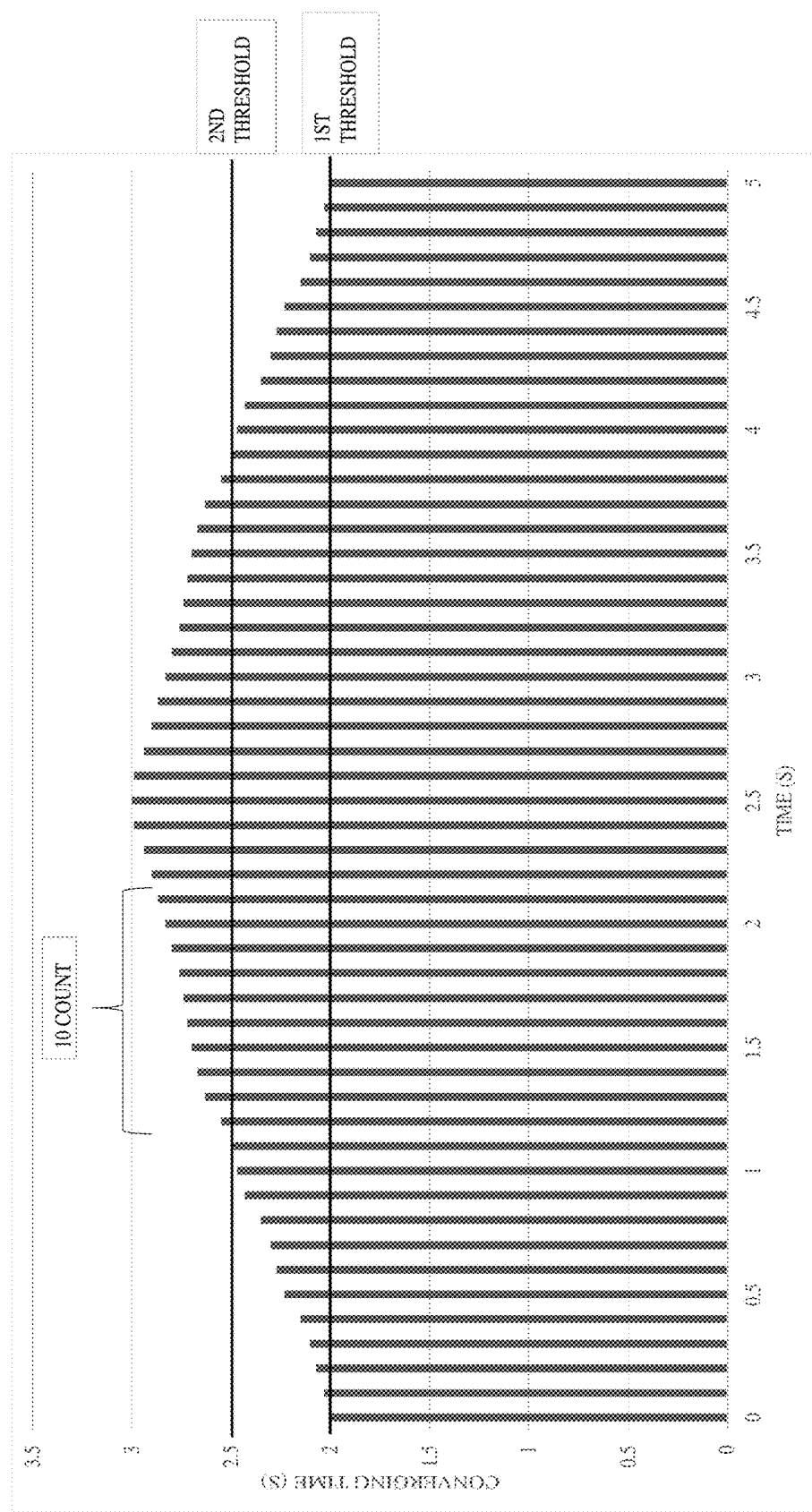
FIG. 7A is a graph of a converging time compared to a first threshold and a second threshold in a third example.
Figure 7B:
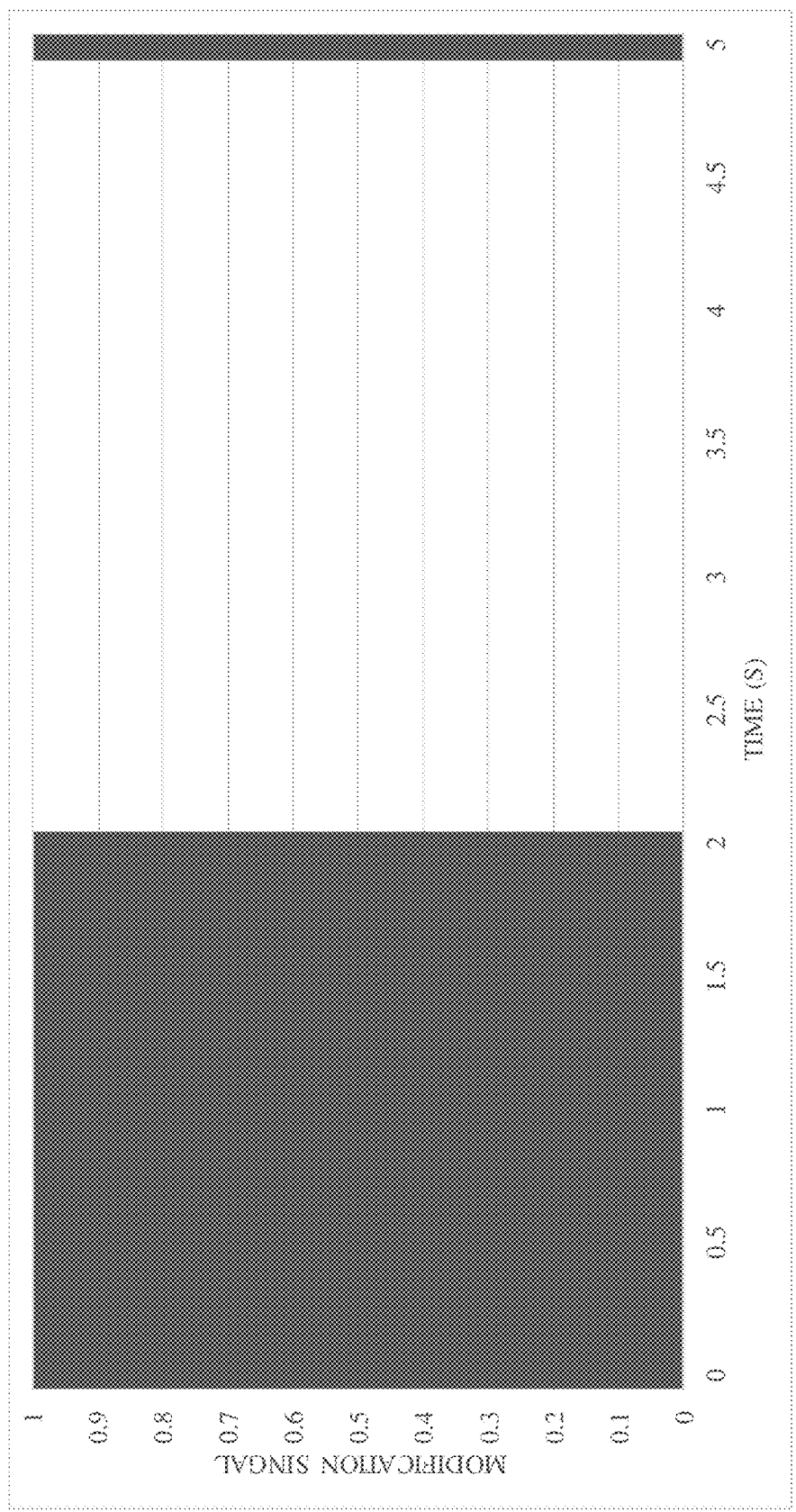
FIG. 7B is a graph of an operation of the host vehicle resulting from the graph of FIG. 7A with the inclusion of a sampling point count.

FIG. 7A is a graph of a converging time compared to a first threshold and a second threshold in a third example. In this example, one of the vehicles gradually slows down and then speeds up again. FIG. 7B is a graph of an operation of the host vehicle resulting from the graph of FIG. 7A with the inclusion of a sampling point count. Again, the defined number of sampling points is 10. As can be seen from FIG. 7B, and referring again to the method 3000, once the modified operation begins at 0 seconds, the answer to the query at 3040 is yes. While the converging time remains below the second threshold in response to the query at 3080, a count is re-initialized at 3090 for each sampling point. When the converging time first exceeds the second threshold at about 1.1 seconds in response to the query at 3080, the count is incremented at 3100. Like FIGS. 6A and 6B, the count of contiguous sampling points above the second threshold reaches the defined number of 10 counts at 3110. As a result, the method 3000 proceeds to 3120 to end the modified operation at about 2.1 seconds. In this case, the method 3000 keeps repeating the processing of 3010-3050 until the response to the query of 3050 is yes at 5 seconds because the converging time once again falls below the first threshold. In this case, the modified operation of the host vehicle is re-started at 3060 responsive to the converging time subsequently falling below the first threshold, and the count is re-initialized at 3070 before the next sampling point is considered starting at 3010.

Figure 8A:
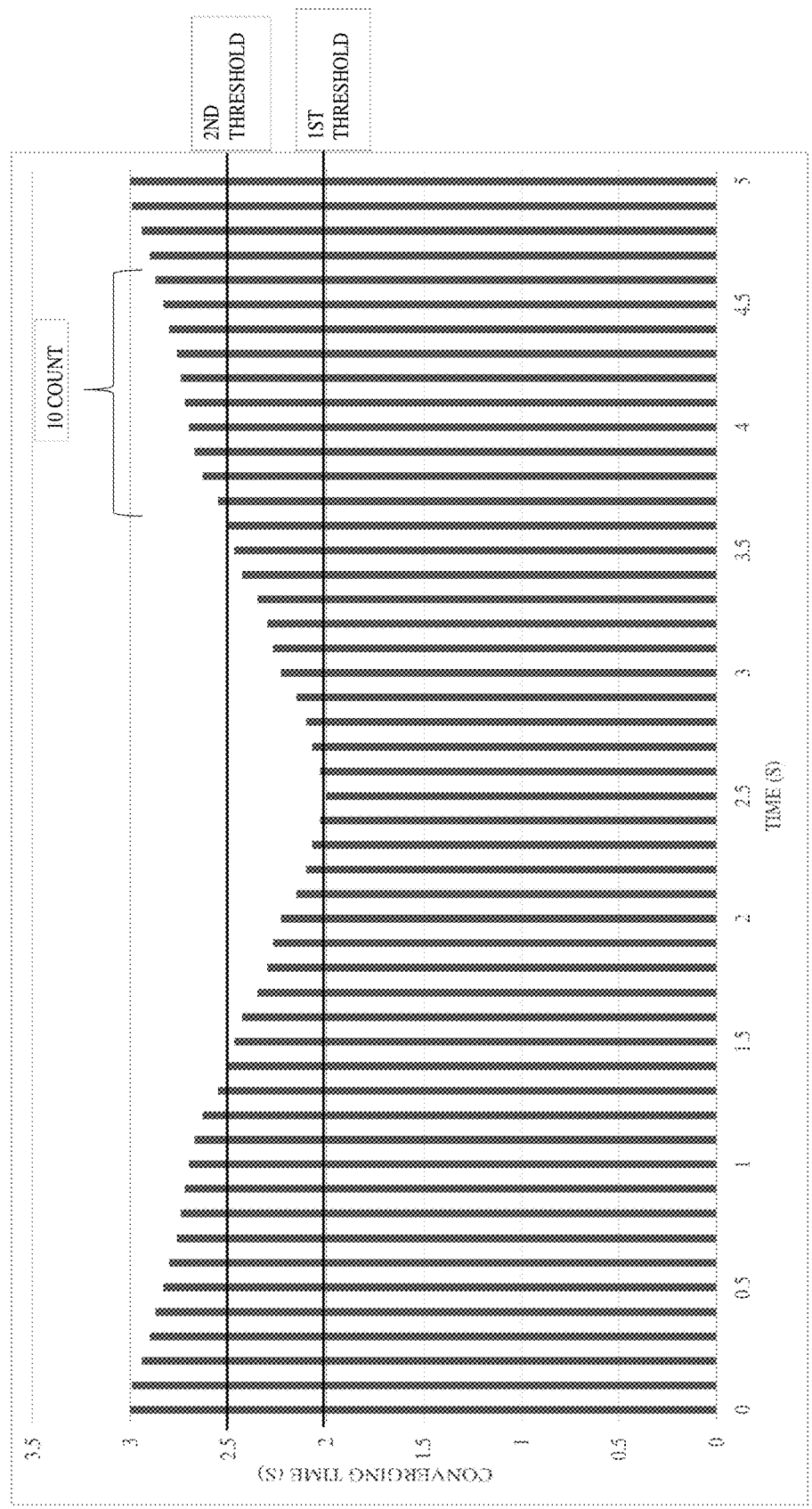
FIG. 8A is a graph of a converging time compared to a first threshold and a second threshold in a fourth example.
Figure 8B:
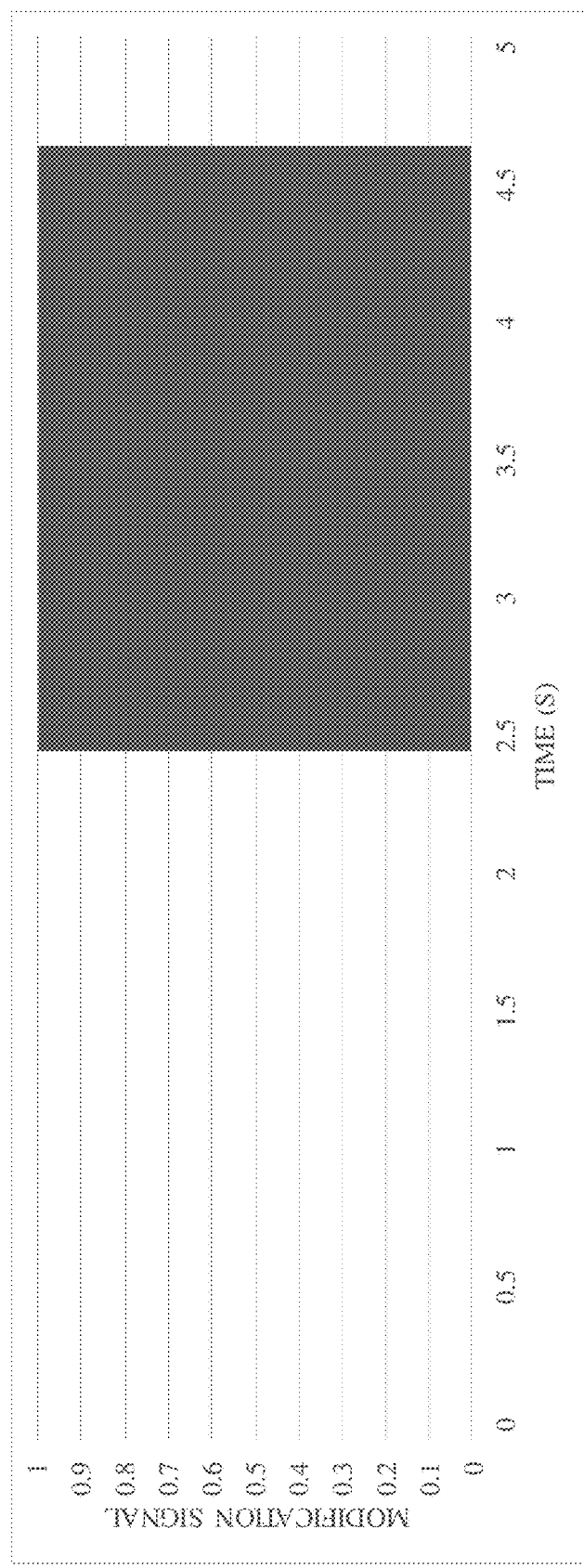
FIG. 8B is a graph of an operation of the host vehicle resulting from the graph of FIG. 8A with the inclusion of a sampling point count.

FIG. 8A is a graph of a converging time compared to a first threshold and a second threshold in a fourth example. In this example, one of the vehicles gradually speeds up and then slows down. This could reflect a situation where a host vehicle speeds up, is alerted of a potential threat, and then slows down to avoid that threat. This can be seen by reference to FIG. 8B, which is a graph of an operation of the host vehicle resulting from the graph of FIG. 8A with the inclusion of a sampling point count of 10. Referring again to the method 3000, the method 3000 keeps repeating the processing of 3010-3050 until the response to the query of 3050 is yes at 2.5 seconds because the converging time initially falls below the first threshold after having been above the first threshold. In this case, the modified operation of the host vehicle is start at 3060, and the count is initialized at 3070 before the next sampling point is considered starting at 3010. Once the modified operation begins at 2.5 seconds, the answer to the query at 3040 is yes. While the converging time remains below the second threshold in response to the query at 3080, a count is re-initialized at 3090 for each sampling point. When the converging time first exceeds the second threshold at about 3.7 seconds in response to the query at 3080, the count is incremented at 3100. The count of contiguous sampling points above the second threshold reaches the defined number of 10 counts at 3110. As a result, the method 3000 proceeds to 3120 to end the modified operation at about 4.7 seconds.

Variations in the teachings herein are possible. For example, this description mainly uses a warning signal as an example of the modified operation of the host vehicle. Accordingly, detecting a change in vehicle operation at 3130 in the method 3000 of FIG. 3 is discussed only with respect to the remote vehicle (e.g., changes in heading or direction, or ending operation of the remote vehicle). In some implementations, the query of 3130 may encompass similar changes in the operation of the host vehicle. The teachings herein describe a first threshold that initiates the modified operation, and a second threshold used to determine when to end the modified operation. However, more than one modified operation is possible, and each may be tied to respective first and second thresholds. For example, modified operations may be tiered based on the amount of time available before the converging point is reached. A first modified operation may be an alarm, while the second modified operation uses lower first and second thresholds that would modify the operation of the powertrain of the host vehicle, such as slowing down or speeding up the host vehicle, or changing its steering direction as described herein. While the processing herein is described with respect to one vehicle, a remote vehicle may also have a similar warning system and is, in that case, a host vehicle in accordance with the teachings herein.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for operating a host vehicle, comprising:
identifying remote vehicle information indicating a geospatial state and a kinematic state for a remote vehicle;
identifying host vehicle information indicating a geospatial state and a kinematic state for the host vehicle;
for a sequence of sampling points, determining a converging time to a converging location within a transportation network based on the remote vehicle information and the host vehicle information;
modifying operation of the host vehicle to a modified operation responsive the converging time, having been above a first threshold, falling below the first threshold; and
maintaining the modified operation of the host vehicle until the converging time remains above a second threshold higher than the first threshold for a defined number of contiguous sampling points of the sequence.

2. The method of claim 1, further comprising:
initializing a counter responsive to the converging time falling below the first threshold; and
responsive to the converging time exceeding the second threshold, incrementing the counter.

3. The method of claim 2, further comprising:
after incrementing the counter, and before the counter reaches the defined number of contiguous sampling points, re-initializing the counter responsive to the converging time falling below the second threshold.

4. The method of claim 1, wherein maintaining the modified operation of the host vehicle until the converging time remains above the second threshold higher than the first threshold for the defined number of contiguous sampling points of the sequence comprises:
maintaining the modified operation of the host vehicle when the converging time falls below the second threshold before the defined number of contiguous sampling points of the sequence is reached.

5. The method of claim 1, wherein maintaining the modified operation of the host vehicle until the converging time remains above the second threshold higher than the first threshold for the defined number of contiguous sampling points of the sequence comprises:
ending the modified operation of the host vehicle when the defined number of contiguous sampling points of the sequence is reached; and
re-starting the modified operation of the host vehicle responsive the converging time subsequently falling below the first threshold.

6. The method of claim 5, further comprising:
after re-starting the modified operation, maintaining the modified operation of the host vehicle until the converging time remains above the second threshold for the defined number of contiguous sampling points of the sequence or until the remote vehicle information indicates that the remote vehicle is no longer on a converging path with the host vehicle.

7. The method of claim 6, wherein the remote vehicle information indicates that the remote vehicle is no longer on a converging path with the host vehicle responsive to a heading change of the remote vehicle.

8. The method of claim 6, further comprising:
for a sampling point after re-starting the modified operation, determining the converging path with the host vehicle as long as the defined number of contiguous sampling points has not been reached.

9. The method of claim 5, further comprising:
after re-starting the modified operation, ending the modified operation of the host vehicle responsive to the converging time remaining above the second threshold for the defined number of contiguous sampling points of the sequence unless, before the defined number of contiguous sampling points is reached, the remote vehicle information indicates that the remote vehicle is no longer on a converging path with the host vehicle.

10. The method of claim 1, wherein the first threshold is a warning threshold of between two to four seconds, inclusive, and the second threshold is a hysteresis threshold at least one second higher than the warning threshold.

11. The method of claim 1, wherein the defined number of contiguous sampling points of the sequence is based on a speed of the host vehicle.

12. The method of claim 1, wherein the geospatial state of the remote vehicle and the geospatial state of the host vehicle are Global Positioning Satellite coordinates.

13. The method of claim 1, wherein modifying operation of the host vehicle comprises issuing a warning using at least one of an audio output device or a visual output device.

14. A host vehicle, comprising:
a powertrain;
a sensor; and
an operation system to operate the vehicle, the operation system configured to:
identify remote vehicle information indicating a geospatial state and a kinematic state for a remote vehicle;
identify, using at least the sensor, host vehicle information indicating a geospatial state and a kinematic state for the host vehicle;
for a sequence of sampling points, determine a converging time to a converging location within a transportation network based on the remote vehicle information and the host vehicle information;
modify operation of the host vehicle to a modified operation responsive to the converging time, having been above a first threshold, falling below the first threshold; and
maintain the modified operation of the host vehicle until the converging time remains above a second threshold higher than the first threshold for a defined number of contiguous sampling points of the sequence or until the remote vehicle information indicates that the remote vehicle is no longer on a converging path with the host vehicle, whichever occurs first.

15. The host vehicle of claim 14, wherein the kinematic state of the host vehicle comprises a speed of the host vehicle, and the operation system is configured to modify operation of the host vehicle responsive to the converging time reaching the first threshold by transmitting a control signal to the powertrain.

16. The host vehicle of claim 14, further comprising:
an audio output device; and
a visual output device, wherein the operation system is configured to modify operation of the host vehicle by generating a warning using at least one of the audio output device or the visual output device.

17. An apparatus for controlling a host vehicle, comprising:
a processor; and
memory storing instructions that cause the processor to perform a method comprising:
identifying remote vehicle information indicating a geospatial state and a kinematic state for a remote vehicle;
identifying host vehicle information indicating a geospatial state and a kinematic state for the host vehicle;
for a sequence of sampling points, determining a converging time to a converging location within a transportation network based on the remote vehicle information and the host vehicle information;
modifying operation of the host vehicle to a modified operation responsive the converging time, having been above a first threshold, falling below the first threshold; and
ending the modified operation of the host vehicle, as long as the host vehicle information indicates that the host vehicle is not off, only if at least one of the converging time remains above a second threshold higher than the first threshold for a defined number of contiguous sampling points of the sequence or the remote vehicle information indicates that the remote vehicle is no longer on a converging path with the host vehicle.

18. The apparatus of claim 17, wherein the instructions cause the processor to perform a method further comprising:
initializing a counter responsive to the converging time falling below the first threshold;
upon a condition that the converging time exceeds the second threshold after initializing the counter, incrementing the counter and comparing the counter to the defined number of contiguous sampling points; and
upon a condition that the converging time does not exceed the second threshold after initializing the counter, re-initializing the counter.

19. The apparatus of claim 18, wherein the instructions cause the processor to perform a method further comprising:
upon a condition that the counter is below the defined number of contiguous sampling points, determining whether the remote vehicle information indicates that the remote vehicle is no longer on the converging path with the host vehicle.

20. The apparatus of claim 19, wherein the instructions cause the processor to perform a method further comprising:
modifying operation of the host vehicle by at least one of signaling a warning to an operator of the host vehicle or modifying a speed or heading of the host vehicle.

* * * * *